June 30, 1936.                R. K. DAY                2,045,701
DIFFERENTIAL PRESSURE GAUGE
Filed May 25, 1934
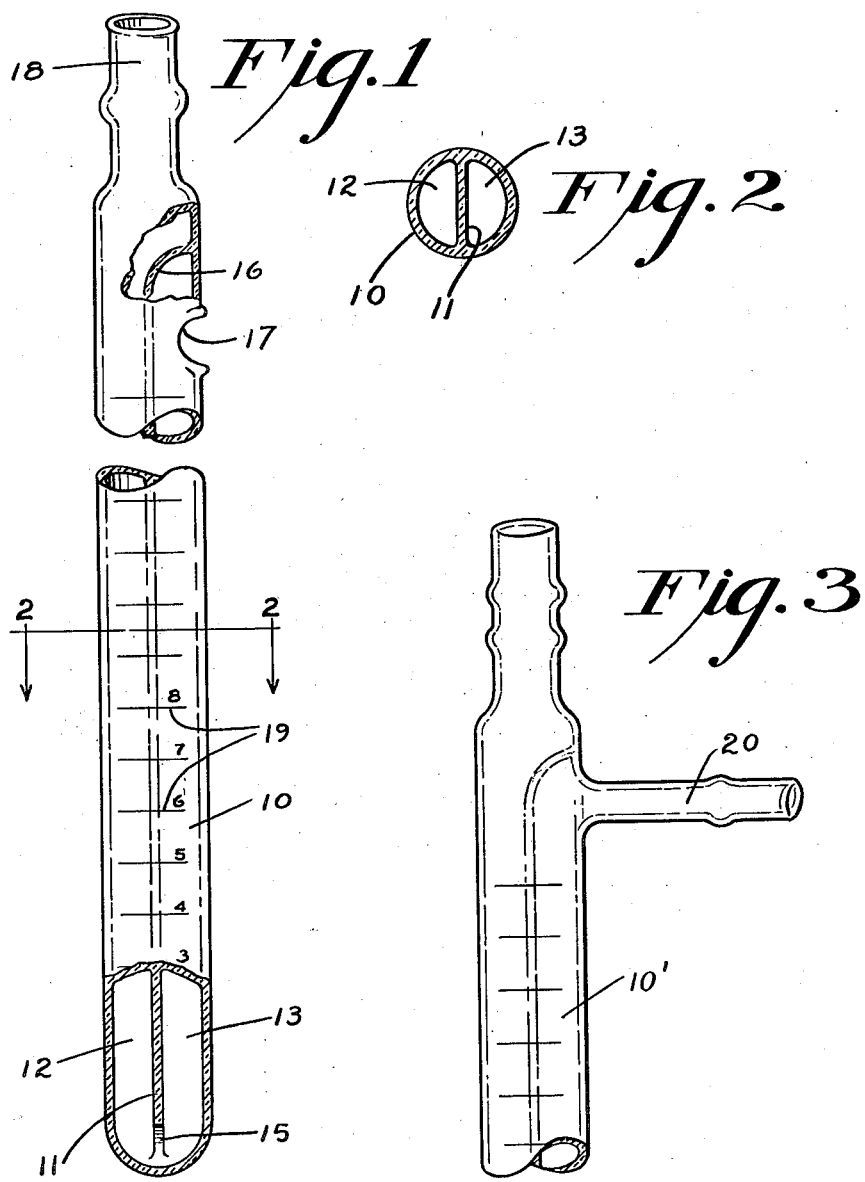
INVENTOR.
RALPH K. DAY
BY Horsey Cole
ATTORNEYS.

Patented June 30, 1936

2,045,701

UNITED STATES PATENT OFFICE 2,045,701

DIFFERENTIAL PRESSURE GAUGE

Ralph K. Day, Corning, N. Y., assignor to Corning Glass Works, Corning, N. Y., a corporation of New York Application May 25, 1934, Serial No. 727,548

2 Claims. (Cl. 73—31)

This invention relates to differential pressure gauges and tubing therefor, and more particularly to that class of apparatus commonly known in the art as manometers, sphygmanometers, barometers, and the like.

In the construction of such apparatus it has been common practice to mount a glass U-tube, containing a suitable liquid, upon a base and to support between the legs thereof a scale so that when one end of the tube is connected to a source of pressure the liquid will be depressed in one leg of the tube and elevated in the other, thus giving an indication of the pressure on the upper end of one column of liquid. The difference between the upper ends of the liquid columns is then read and translated into pressure units in accordance with the character of service in which the gauge is being used.

Difficulties with this type of apparatus have been experienced since the tubes and scale are subject to misadjustment on the base and there is no assurance that such will not occur during the handling of the apparatus, with the result that readings taken in succession cannot be depended upon as being absolutely accurate. Other objections to such a construction are that unless the legs of the U-tube are always maintained in parallel relation, the accuracy of the device cannot be depended upon.

The object of the present invention is to ensure absolute accuracy of instruments of this type.

Another object is to simplify the construction and to facilitate the reading of differential pressure gauges.

The above and other objects may be accomplished by employing my invention which embodies among its features a single tube having a longitudinally extending partition which divides it into a pair of parallel passages which are connected at their lowermost ends, a suitable indicating liquid in the tube standing as two columns separated by the partition and graduations etched or engraved upon the tube and overlapping both passages so that the difference between the upper ends of the liquid columns can be readily ascertained. Other features embody a suitable tubulation at the upper end of the tube which is so formed as to open into one passage and a vent at the upper end of the other passage.

In the drawing:

Fig. 1 is a fragmentary side view of a manometer tube embodying my invention;

Fig. 2 is a transverse sectional view taken on the line 2—2 of Fig. 1; and

Fig. 3 is a fragmentary side view of a modified form of tube showing it equipped for use in measuring one pressure against another.

Referring to the drawing in detail, a glass tube 10 is provided with a longitudinally extending partition 11 which separates the tube into two separate passages 12 and 13. As shown in Fig. 1, the lower end of the partition 11 terminates short of the lower closed end 14 of the tube 10 to form a passage 15 through which communication is established between the lower ends of the passages 12 and 13. The upper end of the partition is bent over as at 16 and is sealed to one side of the tube 10 in order to close the upper end of the passage 13, and formed in the side of the tube 10 near its upper end is a vent 17 for the passage 13. A tubulation 18 is formed at the upper end of the tube 10 and serves as a nipple to which the pressure to be gauged is connected. Etched or engraved upon the tube 10 in such a manner as to overlap both passages 12 and 13 is a scale 19.

In the modification shown in Fig. 3, the structure above recited is substantially the same except that extending outwardly from the tube 10' in place of the vent 17 is a tubulation 20 to which a pressure tube may be connected so that two pressures may be connected to the device and a reading of one against the other obtained.

In operation a suitable liquid, preferably colored, is introduced into the tube 10 and rises in the passages to a predetermined level. Upon connecting the tubulation 18 to a source of pressure to be measured, the upper end of the liquid column in passage 12 will be depressed with a corresponding rise of the upper end of the liquid column in passage 13 and the difference between them can readily be determined by a glance at the scale 19, it being understood that the air on the upper end of the liquid column in the passage 13 will be driven out through the vent 17. In using the modification illustrated in Fig. 3, pressure is introduced into both passages of the tube 10' and the difference between the pressures can be readily determined by reading the scale carried by the tube.

While in the foregoing there has been shown and described the preferred embodiment of my invention, it is to be understood that minor changes in the details of construction, combination, and arrangement of parts may be resorted to without departing from the spirit and scope of my invention as claimed.

What I claim is:

1. In a differential pressure gauge, a transparent tube closed at one end, a partition extending longitudinally of the tube, said partition having its longitudinal edges sealed to the wall of the tube to separate the tube into two parallel passages and said partition wall terminating in spaced relation to the closed end of the tube to establish communication between the passages.

2. A transparent tube for a differential pressure gauge having a closed end, a partition wall extending longitudinally of the tube, said partition wall having its longitudinal edges sealed to the wall of the tube, said partition wall terminating in spaced relation to the closed end of the tube and forming parallel communicating passages within the tube and graduations on the tube overlying one edge of the partition wall and extending partially over both passages.

RALPH K. DAY.